Patented Aug. 10, 1954

2,686,155

UNITED STATES PATENT OFFICE 2,686,155

PROCESS FOR PRODUCING A MOLDED SOLID MOLYBDENUM DISULFIDE LUBRICANT MEMBER

Hilary B. Willis, Pittsburgh, and Herbert S. Hopkins, Irwin, Pa., assignors to Westinghouse Electric Corporation, East Pittsburgh, Pa., a corporation of Pennsylvania No Drawing. Application January 17, 1950, Serial No. 139,118

2 Claims. (Cl. 252—12)

The present invention relates to the process for producing molded solid lubricant members and the product so produced.

Many advantages are realized in applying to bearing surfaces solid lubricants selected from the class consisting of the disulfides, selenides, and tellurides of molybdenum, tungsten and titanium. These solid lubricants in many instances have an unusual superiority over other known liquid and solid lubricants such, for example, as oils and graphite. Hereinafter molybdenum disulfide will be employed as exemplary of the entire class of the solid lubricants. It will be understood, however, that any other or all of the solid lubricants of this class may be substituted for the molybdenum disulfide.

Extensive experience with molybdenum disulfide has indicated certain minor shortcomings of the compound when applied as a lubricant to bearing surfaces. In some cases, the molybdenum disulfide lubricant is purified as disclosed in E. B. Kaercher Patent 2,367,946, by treatment with hydrofluoric acid. Occasionally, slight amounts of the hydrofluoric acid are unavoidably present in the purified molybdenum disulfide, and when applied to steel bearings and the like, corrosion of the metal surface may take place. The corrosion obviously will be detrimental to highly finished bearing surfaces. It has been found further that under some conditions of high temperatures and high humidities or in the presence of water, hydrolysis may take place by reaction of water with molybdenum disulfide, thereby forming hydrogen sulfide which in itself is detrimental to metal bearing surfaces; and, further, oxidation of the hydrogen sulfide may take place with the formation of sulfuric acid which also is detrimental to the metal bearings. It has also been found that molybdenum disulfide in powder form is inconvenient and at times difficult to apply to bearing surfaces.

The object of this invention is to provide for molded members comprising a thermoset resinous body embodying a uniform dispersion therein of finely divided solid lubricant, such as molybdenum disulfide and an alkaline stabilizer.

A further object of the invention is to provide a process for molding members from mixtures embodying a thermosettable resinous composition, a solid lubricant, such as molybdenum disulfide, and an alkaline stabilizer.

Other objects of the invention will in part be obvious and will in part appear hereinafter.

It has been discovered that molded bodies or members embodying substantial quantities of a solid lubricant may be prepared by combining a solid lubricant, such as finely divided molybdenum disulfide, with certain proportions of powdered thermosettable resinous materials and a small proportion of an alkaline stabilizer. When admixed intimately and molded under heat and pressure, the mixture forms solid bodies that may be employed directly as bearings or may be applied to bearings to impart thereto the required amount of the solid lubricant.

More specifically, solid lubricant members may be prepared by intimately mixing as essential ingredients from 79.9 to 97.5 parts by weight of finely divided molybdenum disulfide, from 20 to 0.5 parts by weight of a thermosettable resinous molding powder selected from at least one of the group consisting of phenol-aldehyde admixed with at least one methylene-containing compound selected from the group consisting of paraformaldehyde and hexamethylene tetramine, ureaaldehyde, polyesters and melamine-aldehyde, and from 0.1 to 2 parts by weight of at least one alkaline stabilizer for the molybdenum disulfide selected from the group consisting of the alkaline-earth metal oxides, hydroxides, carbonates and ethoxides, and molding the mixture under heat and pressure to cause the mixture of resinous powder and methylene-containing compound to react to a thermoset resin. With the higher proportions of resin, the product is progressively harder and stronger. Below 5% resin, the products are usable for rubbing shafts to apply thereto a coating of the solid lubricant.

The molybdenum disulfide or any one or all of the solid lubricants selected from the class consisting of the disulfides, selenides and tellurides of molybdenum, tungsten and titanium is prepared in a purified form, preferably by the process set forth in the Kaercher Patent 2,367,946. However, it is to be understood that the lubricant may be secured in a pure state in other ways, for example, an artificial solid lubricant in a highly purified state may be prepared by reacting pure molybdenum with pure sulfur or by selecting pure samples of the natural mineral. In any event, the solid lubricant is employed in a finely divided form of a fineness sufficient to pass through a 100-mesh screen or finer. In some cases, we have found it advantageous to ball mill the molybdenum disulfide for several hours to particle sizes of from 1 to 50 microns in dimension.

The moldable thermosettable resinous powders are well known and are available in the trade as dry molding powders. For example, a phenol-aldehyde molding powder is prepared by admixing 1 mole of a phenol with from 0.5 to 0.8 mole of an aldehyde, such as formaldehyde, acetaldehyde, or furfural, and reacting in the presence of an acid, such as HCl, or alkaline catalyst at reflux temperature in water for about one hour. Thereafter, the resinous composition is dehydrated under vacuum to remove water and while hot the resin is dumped into a pan and cooled to a solid. The resin solid is a non-heat-hardening novolak type resin and may be crushed to a fine powder. The resinous powder may be admixed with sufficient paraformaldehyde or hexamethylene tetramine to provide an amount of aldehyde sufficient to react with the phenol and provide a thermosetting resin. A total of at least 1 mole of aldehyde per mole of phenol is required. Urea and melamine may be reacted with an aldehyde to produce an initial B-stage powdered resinous product. The proportions with melamine should be at least 3 but not exceeding 6 moles of aldehyde per mole of melamine in preparing the initial partial reaction product in solution which can be dried as by spraying to give a molding powder. Urea may be reacted with from 1 mole to 2 moles of aldehyde to produce a methylolurea product that can be dried to a molding powder.

Thermosettable polyester molding products can be secured by reacting polycarboxylic organic acids or their anhydrides with polyhydric alcohols or epoxides, either the acid or the alcohol being trifunctional or of a higher functionality. By functionality, it is understood that reactive olefinic groups contribute a functionality of two, while each carboxyl group or hydroxyl group contributes a functionality of one, while an acid anhydride group or epoxide group contributes a functionality of two to the respective compound. Pentaerythritol, having a functionality of four, may be reacted with succinic acid, having a functionality of two, or acrylic acid, having a functionality of three, to produce a thermosettable polyester resin powder. Maleic anhydride, with a functionality of four, may be reacted with propylene glycol, with a functionality of two, or pentaerythritol, with a functionality of four, to produce a thermosetting powder. Propylene epoxide may be reacted with fumaric acid, with a functionality of four, to produce a thermosettable polyester powder. Examples and processes for producing such molding materials are set forth in U. S. Patents 1,722,554; 1,541,336 and 2,409,633.

The alkaline stabilizers used in practicing the invention comprise the oxides, hydroxides, carbonates and ethoxides of barium, calcium, and strontium. All of these alkaline-earth metal compounds form insoluble, non-corrosive fluorides and sulphates; therefore, any reactive fluoride or sulphate produced or present in the molybdenum disulfide will react with the alkaline-earth metal stabilizers and be converted to an insoluble, inactive form not detrimental to the bearings.

In the processing, the mixture of solid lubricant, resinous powder and alkaline stabilizer are preferably admixed in suitable proportions and placed in a ball mill or other mixing apparatus which is operated to secure a very intimate dispersion and uniform distribution of the ingredients. The powder may be then placed in a heated molding press where it may be compressed at pressures of from 100 pounds to 5,000 p. s. i. and the resin converted to a thermoset resinous body by heating at temperatures of up to 180° C. The members may be molded in the form of sticks, plates, bearing shells and similar structures that may be applied to bearing surfaces. Thus, the sticks of the molded product may be fed against a bearing surface by a spring in a manner similar to the application of a carbon brush to a commutator in an electric motor. The plates of the molded lubricant may be employed as inserts in metal bearing surfaces to operate against the mating bearing surfaces to apply to the latter small amounts of the solid lubricant. In other cases, bearing shells, preferably containing at least 10% by weight of the resinous binder, may be prepared and placed on shafts or in the journals supporting shafts. Other structures may be molded and employed for either supporting moving bearing structures in which the molded solid lubricant member is either a part or the entire bearing surface against which a metal member operates or the solid lubricant is applied to metallic bearings to rub thereon a part of the solid lubricant. In either case, a substantially non-dusting coating of the solid lubricant is applied to the metallic bearing members.

The following examples are illustrative of the practice of the invention:

Example I

In a ball mill there was placed 1200 parts by weight of molybdenum disulfide
21.9 parts of a phenol-formaldehyde novolak resin
2.5 parts of hexamethylene tetramine
6.1 parts of calcium oxide.

After ball milling for one hour to obtain a thorough admixture, the powder was molded into a bar of a cross section of ½ inch by ½ inch by 5 inches long at a pressure of 2,000 p. s. i. at a temperature of from 150° C. to 170° C. The bar when pressed against a rotating shaft would apply thereto a coating of the molybdenum disulfide by a rubbing action. The bar had good mechanical strength.

Example II

Into a ball mill there was placed 1200 parts of molybdenum disulfide
54.5 parts of phenol-formaldehyde novolak resin
6.3 parts of hexamethylene tetramine
6.3 parts of calcium oxide After ball milling for one hour, the mixture was molded in a press at a pressure of 4,000 p. s. i. at 160° C. for ten minutes. The resulting molded bar would coat a rotating bearing shaft with the lubricant when pressed against the shaft by hand pressure. The bar was mechanically strong.

Example III 270 parts by weight of molybdenum disulfide
26.85 parts of phenol-formaldehyde novolak resin
3 parts of hexamethylene tetramine
0.15 part of calcium stearate
5 parts by weight of barium hydroxide were admixed and ball milled. The ball milled product was placed in a mold and heated at a pressure of 1,000 p. s. i. and a temperature of 150° C. for fifteen minutes. A hard compressed bar with considerable strength was secured. When applied to a rotating steel shaft, only a barely visible film was rubbed off onto the shaft. The bar was strong so that it could be used as a bearing member or inset into a bearing surface to apply molybdenum disulfide to a matching bearing surface.

*Example IV*

A mixture is prepared from 240 parts of molybdenum disulfide
53 parts of a melamine-formaldehyde molding powder
1.2 parts of paraformaldehyde
4 parts of strontium ethoxide The mixture is ball milled for one hour and then placed in a mold where the powder is compressed at a pressure of 2,000 p. s. i. and a temperature of 170° C. A very hard resinous member results. When applied to a rotating steel shaft, a scarcely noticeable mark is made, indicating that very little of the lubricant is rubbed off. Bearing liners and bearings for metal shafts may be produced from this mixture.

We have machined the molded members of this invention into various bearing structures and found that they could be readily drilled, milled and turned in a lathe. The composition of Example I was molded into a bar and then drilled and turned in a lathe into a bearing for a fan operating under adverse atmospheric conditions. The molded bearing was extremely quiet and superior in all respects to the metallic bearing it replaced. In another case a bearing was machined from the composition of Example III for a shaft one inch in diameter used in a heavily loaded mill. It operated excellently and no corrosion was observed over a long period of time.

Tests of the molded members of this invention in wet atmospheres and steam atmospheres at elevated temperatures and room temperature have shown that the solid lubricant does not produce any corrosive products which would be detrimental to metal shafts with which it is in contact. When used in dust-laden atmospheres, the lubricant is dry and has no tendency to pick up dirt or dust as occurs with oils and other liquid lubricants.

It will be appreciated that small amounts of mold lubricants, such as calcium stearate, may be admixed in the powders. Likewise, dyes or small amounts of wood flour and similar fillers not detrimental to bearing action may be added in an amount not exceeding 10% of the weight of the composition.

Since certain changes in carrying out the above process may be made without departing from its scope and the product may be modified slightly, it is intended that all matter contained in the above description shall be interpreted as illustrative and not in a limiting sense.

We claim as our invention:

1. In the process of producing molded solid lubricant members, the steps comprising intimately admixing from 79.9 to 97.5 parts by weight of a solid lubricant composed of finely divided molybdenum disulfide, from 20 to 0.5 parts by weight of a thermosettable resinous molding powder selected from the group consisting of urea-aldehyde resin, melamine-aldehyde resin, polyester resin, and phenol-aldehyde resin admixed with one methylene containing compound of the group consisting of paraformaldehyde and hexamethylene tetramine, from 0.1 to 2 parts by weight of an alkaline stabilizer selected from the group consisting of the alkaline earth metal oxides, hydroxides, carbonates and ethoxides, and molding the mixture under heat and pressure to cause the resinous molding powder to react to a thermoset resin thereby producing the solid member, the stabilizer cooperating to prevent development of acidity in the solid lubricant.

2. The process of claim 1 wherein the solid lubricant is selected from the group consisting of the disulfides, selenides and tellurides of molybdenum, tungsten and titanium.

References Cited in the file of this patent

UNITED STATES PATENTS

| Number | Name | Date |
|---|---|---|
| 300,024 | Smalley | June 10, 1884 |
| 1,054,265 | Baekeland | Feb. 25, 1913 |
| 1,102,473 | Chappell | July 7, 1914 |
| 2,096,737 | Dinley | Oct. 26, 1937 |
| 2,326,000 | Teeple | Aug. 3, 1943 |
| 2,367,946 | Kaercher | Jan. 23, 1945 |
| 2,589,582 | Strughold et al. | Mar. 18, 1952 |

FOREIGN PATENTS

| Number | Country | Date |
|---|---|---|
| 565,955 | Great Britain | Dec. 6, 1944 |